Patented Dec. 1, 1936

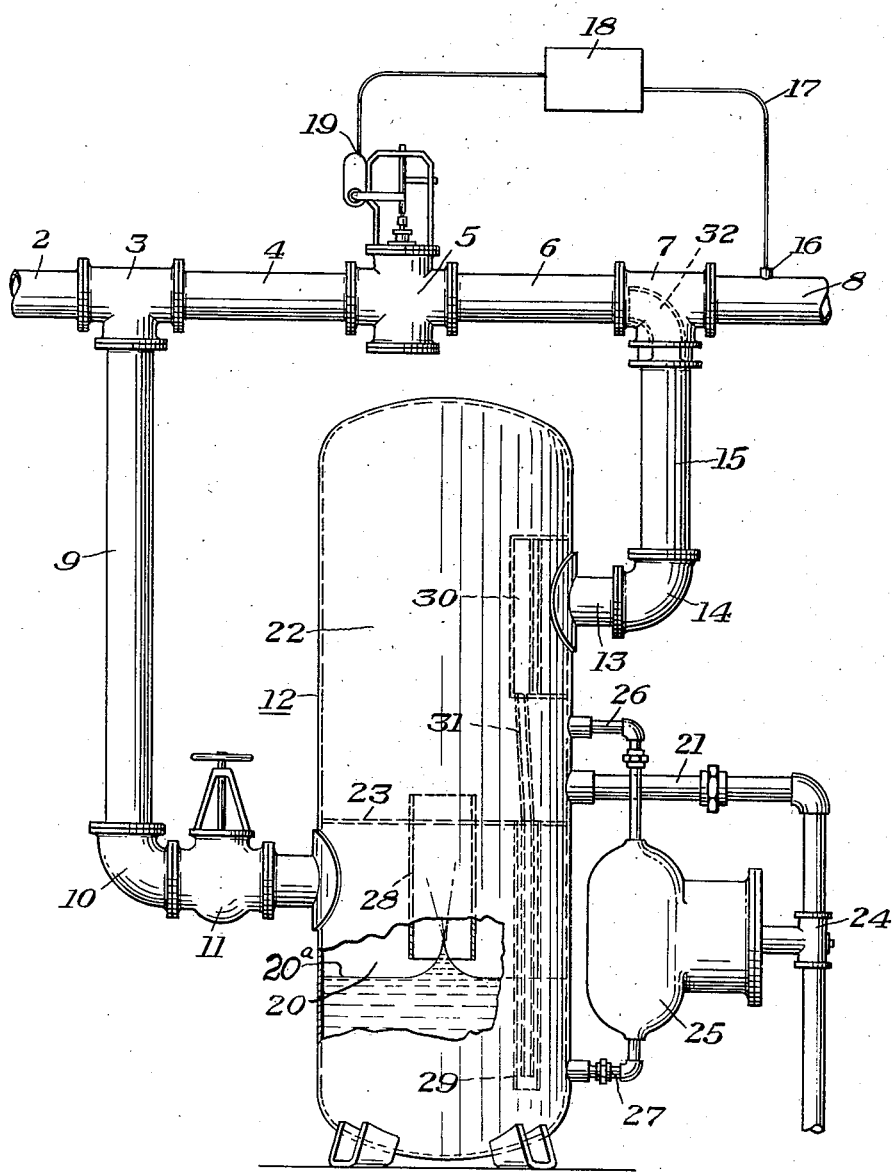

2,062,397

UNITED STATES PATENT OFFICE 2,062,397

APPARATUS FOR DESUPERHEATING STEAM

Willard P. Chandler, Jr., Pittsburgh, Pa., assignor to Blaw-Knox Company, Pittsburgh, Pa., a corporation of New Jersey Application August 20, 1934, Serial No. 740,555

4 Claims. (Cl. 122—479)

The present invention relates to an improved apparatus for effecting desuperheating of steam to any desired extent, and by it I provide a method and apparatus for accomplishing this purpose which are superior to and obviate difficulties encountered in the presently known methods and apparatus.

In many industries it has become customary to utilize highly superheated steam and to have a distribution system for such steam in the industrial plant. There are, however, many cases where it is desirable to utilize steam at lower temperatures than that of the superheated steam in the supply system. In such cases it is desirable to reduce the steam temperature to the desired extent by using this heat to evaporate water. This is called desuperheating, and the apparatus for conducting the process will be referred to herein as a desuperheater. It will be understood, of course, that in using the terms "desuperheating" and "desuperheater" I do not necessarily mean completely eliminating the superheat of the steam, but mean either complete desuperheating or desuperheating to any desired extent.

The ordinary practice in desuperheating steam is to spray into the superheated steam definite amounts of water which is evaporated by contact with the steam, thereby reducing the temperature thereof. This method requires fairly accurate apportionment of the amount of water sprayed into the steam, it being highly desirable that just the right amount of water should be used and no more and no less, in order to obtain the desired desuperheating. If exactly the right amount of water is sprayed into the desuperheated steam and all of it is evaporated, and the exact amount of flow of steam is known, the temperature of the desuperheated steam may be accurately determined. However, if an excess of water is used in the ordinary process, the temperature of desuperheated steam may be reduced below the desired temperature and there may be an accumulation of liquid water in the container. On the other hand, if a deficiency of water is used, the temperature of the steam will not be lowered to the desired point and all of the water will be evaporated in the steam, and any materials which may have been dissolved in the water may reduce to the form of a very dry powder in the dry steam and cause abrasion or clogging of parts or deposits of scale in the apparatus to which the steam is subsequently conducted. For these reasons, the method of spraying predetermined amounts of water into the steam for effecting the desuperheating thereof, while extensively practiced at the present time, is unsatisfactory.

By my invention I obviate the above difficulties by accomplishing the desuperheating by contacting at least a portion of the superheated steam with a very large excess of water, that is, an amount of water appreciably above that which is required to effect the desired desuperheating. In accordance with my invention, I prefer to treat only a portion of the steam in this way and to subsequently mix the treated steam with that portion of the steam which has not been so treated or desuperheated, so as to obtain a mixture of the two at the desired temperature.

In the accompanying drawing I have shown for purposes of illustration only a preferred embodiment of my invention. In the accompanying drawing I have shown in elevation an apparatus in accordance with my invention and which may be used in carrying out the method which I provide.

For the purpose of aiding in a discussion and understanding of my invention, let us assume that in an industrial plant there is a steady supply of steam at 120 lbs. pressure and 750° F. and that there is a steady demand in part of the plant for steam at approximately the same pressure and 500° F. The temperature of saturated steam at 120 lbs. pressure is 341.3° F. Consequently, if some of the steam at 120 lbs. pressure be contacted with an excess of water, the resulting temperature of the steam cannot go below 341.3° F. Saturated steam at 341.3° F. may then be mixed with superheated steam at 750° F. in such proportions as to produce a mixture of steam at 500° F. This mixture, if at 120 lbs. pressure, would therefore have a superheat of the difference between 341.3° F. and 500° F., or 158.7° F.

In the accompanying drawing I have shown a type of contactor for effecting desuperheating of the steam which has become well known and which is fully described in the copending application of Donald A. Sillers, Serial No. 587,684, filed January 20, 1932. Reference is hereby made to said application for a fuller and more complete description of this type of contactor. Reference is hereby also made to my copending application Serial No. 684,864, filed August 12, 1933, for a further description of a contactor of this character.

As shown in the drawing, the superheated steam is supplied to the apparatus by the main steam conduit 2 which stream of steam is divided into two channels by the T 3 in the main conduit. A portion of the steam passes through the pipe 4, a regulating valve 5, and a pipe 6 to a mixer 7 wherein that portion of the steam passing through the aforesaid conduit is mixed with steam bled from the main conduit at the T 3. The mixture of desuperheated steam, after being mixed in the mixer 7, passes from the apparatus to any desired apparatus through conduit 8.

The steam bled from the main conduit at the

T 3 passes through the pipe 9, the elbow 10, the stop valve 11 and the contactor indicated generally by the reference character 12. It then passes through the pipe 13, the elbow 14 and the pipe 15 to the mixer 7 where it is mixed with the steam passing through the other channel.

A thermometer or thermostat 16 is inserted in the pipe 8 beyond the mixer 7 for the purpose of effecting the control of the automatic valve 5. This thermometer or thermostat is provided with a suitable connection 17 with a temperature control unit 18, which in turn is connected by suitable connections indicated generally by the reference character 19 with the regulating valve. By means of these connections the automatic regulating valve 5 is opened wider when the temperature of the partially desuperheated steam drops below the desired temperature and throttled when the temperature of the steam passing through the conduit 8 becomes higher than the desired temperature.

The thermometer or thermostat 16, the temperature control unit 18, the automatic regulating valve 5 and the connections therebetween are all articles which may be purchased in the market and are not of themselves claimed as a part of this invention. It is, therefore, believed unnecessary to describe fully the operation of these devices. It will suffice to say that such control systems are well known in the art to operate either by means of electrical circuits or pneumatic pressure which is supplied in a suitable direction under the control of the thermostat or thermometer.

As the steam passes through the contactor 12, water contained in the lower chamber 20 thereof is evaporated. The water for this evaporation is supplied to the contactor and a proper quantity maintained therein. The water supply pipe is indicated by the reference character 21, this pipe opening into the upper chamber 22 of the contactor above the transversely extending diaphragm 23. In the supply pipe 21 is a flow control valve 24, this valve being operated by the feed water regulator 25 which controls the supply of water so that a proper quantity is maintained in the contactor. The operation of a feed water regulator of this character is well known in the art and it will suffice to state that it is a structure which is adapted to maintain a constant difference in pressure on opposite sides of the diaphragm 23, it being connected to the upper chamber 22 of the contactor by pipe connections 26, and to the lower chamber below the level of the water therein by pipe connections 27. The feed water regulator 25 maintains the pressure drop constant. If the gas flow is maintained constant the feed water regulator will operate to maintain a constant volume of liquid in the contactor, but if the gas flow varies so as to tend to create a variation in the pressure drop the feed water regulator, through its operation of the valve 24, regulates the supply of water to the contactor so as to maintain the pressure drop constant.

In the operation of the particular form of contact device shown in the drawing, the water to be evaporated is kept in the lower chamber 20 so that normally the level of the water is adjacent the lower edge of the tube 28 extending through the diaphragm 23 and providing for flow between the lower and upper chambers of the device. The normal water level in the chamber 20 is indicated by the line 20ª. When the steam is fed into the upper part of the chamber 20, it exerts a pressure on the water and sweeps under the lower edge of the tube or conduit 28, passing up into the chamber 22. As it does so, it tends to form a cone of water inside the tube 28 and to absorb water and break some of the water up into a fine spray which may be carried up through the duct. Some of the water carried up through the duct will not be used for saturating the steam passing therethrough and, consequently, some of it will be precipitated and collect on top of the diaphragm 23. This will be returned to the lower chamber through the pipe 29 which extends into the body of water in the lower chamber of the unit.

In many instances, droplets of water will be carried by the steam upwardly through the upper chamber and in order to prevent this excess of water from being carried by the steam into the mixer 7, a separator 30 of any well known construction is provided for removing such droplets. The water removed by the separator is returned to the lower chamber below the level of the liquid therein by means of a pipe or tube 31 extending downwardly through the diaphragm 23.

As can be seen, the water with which the steam comes in contact is very intimately mixed with the steam and readily evaporated by the surplus heat in the steam. There is a liberal amount of water contacted with the steam so that the temperature of the steam may be reduced approximately to saturation temperature at the pressure employed and, in any event, the steam passing through the unit will not be appreciably above such saturation temperature. This insures that of the water evaporated within the contactor, comparatively few of the droplets carried up with the steam through the tube 28 will be completely evaporated, these droplets on the average being of a size too large for complete evaporation under conditions at which the device is operated. Consequently, little or no solid material will be left by complete evaporation of water droplets as occurs when very finely divided sprays of water are injected into the steam and completely evaporated.

The mixer 7 for mixing the dry superheated steam and the steam passing through the contactor unit may be of any desired character. The one shown in the drawing consists of an elbow 32 which brings the saturated steam into the mixer in such manner that it flows in a direction opposite the flow of the superheated steam with which it is to be mixed. This type of mixing device has been found to be effective in an apparatus of this character.

It should be noted that the temperature control thermostat or thermometer is located in the conduit beyond the mixer so that its control of the temperature regulating valve 5 is such as to secure constant temperature of the mixture, regardless of the temperature of the superheated steam, or of the substantially saturated steam which has passed through the contactor unit.

While I have heretofore referred to the steam passing through the contactor as being substantially saturated, my invention is not limited to a method wherein substantial saturation of the steam passing through the contactor is obtained, for my invention may be practiced and the apparatus disclosed in the drawing may be used satisfactorily even though the steam passing through the contactor is not reduced to saturated steam but is only partially reduced by the contact.

If the flow of steam is constant, the condition of superheated steam supplied maintained uniform, and the loss of head in the contactor kept constant by a proper maintenance of the proper amount of water in the contactor, that is the supply just equaling the evaporation, the desired temperature of outlet steam can be maintained by providing suitable fixed orifices in place of the valves shown. However, if the consumption of steam leaving the mixer varies considerably, the head loss in the contactor might not be strictly proportional to the other losses of head, and proportions of the mix and, consequently, the temperature after passing through the mixture might unduly fluctuate. Such fluctuation is prevented in accordance with my invention by the use of a regulating valve in one of the two lines. I prefer to place the regulating valve in the steam line which does not pass through the contactor.

By the use of the regulator the maintenance of exactly the same amount of water in the contactor at all times is rendered less important, and uniformity in the degree of superheat in the steam supply is also of less importance. Maintenance of a practically constant temperature of the steam delivered by the apparatus is secured regardless of fluctuations in the supply.

The loss in pressure of steam passing through this apparatus is but slight and has practically no effect upon the process of temperature regulation as hereinbefore described. The maintenance of a constant outlet temperature naturally insures the desired degree of superheating in the outlet steam since the pressure is substantially constant.

One of the important features of my invention resides in the fact that the amount of water constantly used for desuperheating the steam and always in the contactor is very greatly in excess of the amount of water required for accomplishing the amount of desuperheating in the steam. By utilizing such an amount of water, the difficulties and objectionable features of the spray type desuperheater are eliminated. In accordance with my invention, there is a large amount of excess water present, only a part of which is evaporated during the passage of the steam, and there is at no time complete evaporation of the water in the desuperheater but only evaporation of such part of it as is necessary to bring a part of the steam to substantially saturation temperature.

In the drawing I have shown a valve 11 in the supply line leading to the contactor unit. This valve would be unnecessary if the size of the regulator valve 5 and the mixer 7 were sufficiently large to permit the operation of the apparatus consuming only sufficient head to operate the contactor and the mixer and to overcome the loss in the separator and the pipes. In actual installations, however, I have found it desirable to provide a valve in this line in order to aid in the regulation of pressure losses in the system. The pressure drop across the system through the branches is substantially equal and in actual operation the regulator valve 5 will be adjusted by means of the automatic temperature regulation so as to secure the proper mixture across the system as a whole. The presence of the valve 11 may, therefore, be regarded as a convenience serving as a hand regulation for the pressure across the system while the regulator valve 5 serves as an automatic regulation.

The present invention, as can be seen from the above description, provides a novel method and apparatus for effecting desuperheating of steam to any desired extent under all operating conditions and in a simple manner, and without the use of complicated or delicate apparatus. Furthermore, the invention provides a method and apparatus which overcomes the difficulties encountered in the practice of the ordinary spray method of desuperheating steam.

As stated above, while I have shown a preferred embodiment of my invention, this is by way of illustration only and various changes and modifications may be made therein within the scope of my invention as defined in the accompanying claims.

I claim:

1. A steam desuperheating apparatus comprising a main steam conduit, a contact unit for effecting contact between a liquid therein and the steam passing therethrough, the arrangement of the contact unit being such that the pressure drop therethrough may be regulated by controlling the liquid level therein, means for supplying water to said unit, means for passing a portion of the superheated steam from said main conduit through said unit, whereby said portion is at least partially desuperheated, means for returning said treated steam to and mixing it with the steam passing through said main conduit, whereby partial desuperheating of said steam to the desired extent is effected, and a regulator for regulating the amount of water in said unit to maintain a substantially constant steam pressure drop therein.

2. In a contactor for liquid and gas, a chamber, a partition therein dividing the chamber into an upper and a lower compartment, means for supplying gas to the lower compartment, means for withdrawing gas from the upper compartment, a conduit opening through the partition and projecting into the lower compartment, means for supplying liquid to said chamber and regulating means for regulating the admission of liquid to said chamber in such quantities as to maintain a substantially constant pressure drop in the gas in passing from the lower compartment to the upper compartment through said conduit.

3. In a contactor for liquid and gas, a chamber, a partition therein dividing the chamber into an upper and a lower compartment, means for supplying gas to the lower compartment, means for withdrawing gas from the upper compartment, a conduit opening through the partition and projecting into the lower compartment to a point below said gas inlet, means for supplying liquid to said chamber, and regulating means for regulating the admission of liquid to said chamber in such quantities as to maintain a substantially constant pressure drop in the gas in passing from the lower compartment to the upper compartment through said conduit.

4. In a contactor for liquid and gas, a chamber, a partition therein dividing the chamber into an upper and a lower compartment, means for supplying gas to the lower compartment, means for withdrawing gas from the upper compartment, a conduit opening through the partition and projecting into the lower compartment, means for supplying liquid to the lower compartment of said chamber, and means for regulating the pressure drop on opposite sides of the partition by regulation of the supply of liquid to said chamber.

WILLARD P. CHANDLER, Jr.